US012359487B1

(12) United States Patent
Baynton et al.

(10) Patent No.: US 12,359,487 B1
(45) Date of Patent: Jul. 15, 2025

(54) WINDOW OPENING CONTROL DEVICE ASSEMBLIES AND METHODS

(71) Applicant: ANDERSEN CORPORATION, Bayport, MN (US)

(72) Inventors: Deslyn Baynton, Eleva, WI (US); Troy Peickert, Menomonie, WI (US); Joshua Biegler, New Richmond, WI (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 18/386,737

(22) Filed: Nov. 3, 2023

Related U.S. Application Data

(60) Provisional application No. 63/425,722, filed on Nov. 16, 2022.

(51) Int. Cl.
*E05F 5/08* (2006.01)

(52) U.S. Cl.
CPC .................................... *E05F 5/08* (2013.01)

(58) Field of Classification Search
CPC .... E05B 65/0852; E05B 63/20; E05C 19/022; E05F 5/08; Y10T 292/65; Y10T 292/47
USPC .................. 206/325; 292/342, 338, DIG. 47; 49/380, 183
See application file for complete search history.

(56) References Cited

U.S. PATENT DOCUMENTS

| | | | | |
|---|---|---|---|---|
| 1,322,677 | A * | 11/1919 | Ditlefsen | E05F 11/00 292/210 |
| 7,559,588 | B2 | 7/2009 | Liang | |
| 8,776,440 | B2 * | 7/2014 | Sopkowiak | E05B 65/0835 292/DIG. 47 |
| 9,816,300 | B2 | 11/2017 | Derham | |
| 11,047,157 | B1 | 6/2021 | Derham | |
| 11,168,495 | B1 * | 11/2021 | Liang | E05B 63/20 |
| 11,180,942 | B1 | 11/2021 | Lawrence | |
| 2007/0222234 | A1 * | 9/2007 | Liang | E05C 17/50 292/338 |

* cited by examiner

*Primary Examiner* — Marcus Menezes
(74) *Attorney, Agent, or Firm* — Mueting Raasch Group

(57) ABSTRACT

Window opening control device assemblies including packing clips, fenestration units including the window opening control device assemblies, and related methods are described herein. A packing clip holds the toggle of the window opening control device in a neutral configuration such that the window opening control device and/or the sash are not damaged during the assembly process, shipping, or installation of fenestration units using the window opening control device assemblies.

20 Claims, 5 Drawing Sheets

WINDOW OPENING CONTROL DEVICE ASSEMBLIES AND METHODS

RELATED APPLICATION

The present application claims the benefit under 35 U.S.C. § 119 (e) of U.S. Provisional Patent Application 63/425,722 filed on Nov. 16, 2022, which is hereby incorporated by reference in its entirety.

Window opening control device assemblies including packing clips, fenestration units including the window opening control device assemblies, and related methods are described herein.

Windows having one or more movable sashes in a frame are commonly referred to as single hung windows (in which a movable sash and a fixed sash are contained in a frame and the movable sash moves vertically within the frame), double hung windows (in which two movable sashes are arranged vertically relative to each other and both sashes can move vertically within the frame) and sliding windows (in which one or more movable sashes move horizontally within a frame).

Because at least one sash can move within the frames of these windows, it may be desirable to limit the degree or amount of unrestricted opening in the interest of safety. Devices commonly referred to as "window opening control devices" or "vent stops" may be provided to limit the degree or amount of unrestricted opening. Window opening control devices are often flush mounted within a sash stile, sash rail, or in a window frame member.

The window opening control devices may be recessed into the sash or jamb so that they are flush with the surface when not in use to allow for full range of movement of a sash. When needed, a toggle of the window opening control device protrudes from the surface in which the device is installed to limit the movement of a sash to a set travel distance based on the location of the window opening control device.

SUMMARY

Window opening control device assemblies including packing clips, fenestration units including the window opening control device assemblies, and related methods are described herein.

In one or more embodiments of the window opening control device assemblies described herein, a packing clip is provided to hold the toggle of the window opening control device in a neutral configuration such that the window opening control device and/or the sash are not damaged during the assembly process, shipping, or installation of fenestration units using the window opening control device assemblies.

The window opening control device assemblies described herein are used in place of a variety of approaches used to prevent damage to the window opening control devices and/or the sashes of fenestration units. Among those techniques currently used include adhesive tape placed over the window opening control devices. Such adhesive tapes may, however, damage the finish of the sashes to which they are applied or, if the adhesives are not aggressive enough to cause damage to the finish, the tapes may disengage and allow the window opening control devices to move to their extended configuration which may result in damage to the window opening control devices and/or the sashes.

Another approach involving double hung windows may involve the use of packaging material to prevent the upper sash of the double hung window from fully seating in the upper part of the frame to move the window opening control devices on the upper sash to a location below the check rail of the lower sash to prevent damage to the window opening control devices and/or the lower sash. The lack of engagement of the upper sash with the head of the frame may, however, result in other issues such as improper seating of the upper sash in the side liner tracks requiring manipulation of the upper sash back into position.

In a first aspect, one or more embodiments of a window opening control device assembly as described herein may include a housing comprising a cavity and a faceplate attached to the housing, wherein the cavity comprises a cavity opening defined in the faceplate; a toggle attached to the housing, the toggle configured to rotate about a pivot axis passing through the cavity, wherein the toggle comprises a first end and a second end, and wherein the toggle is configured to rotate between an extended configuration in which the first end of the toggle protrudes from the cavity opening and the second end of the toggle is located within the cavity and a passing configuration in which the first end of the toggle is located within the cavity and the second end protrudes from the cavity opening; a packing clip engaged with the toggle, the packing clip comprising a baseplate and a clamp extending from the baseplate into the cavity, wherein the clamp of the packing clip is engaged with the second end of the toggle and the baseplate of the packing clip is proximate the faceplate such that the toggle is retained in a neutral configuration between the extended configuration and the passing configuration, wherein the first end and the second end of the toggle are located in the cavity and the baseplate is positioned over the cavity opening when the toggle is in the neutral configuration; and biasing apparatus operably attached to the toggle, wherein the biasing apparatus is configured to force the toggle to the extended configuration when the packing clip is not engaged with the toggle.

In one or more embodiments of the window opening control device assemblies described herein, the baseplate of the packing clip is seated against the faceplate when the packing clip is engaged with the toggle.

In one or more embodiments of the window opening control device assemblies described herein, the clamp is configured to exert a compressive force on the toggle when the clamp is engaged with the second end of the toggle.

In one or more embodiments of the window opening control device assemblies described herein, the packing clip is engaged with the toggle, the clamp extends into the cavity and towards the first end of the toggle such that the clamp cups the second end of the toggle in the cavity.

In one or more embodiments of the window opening control device assemblies described herein, the clamp is compressed between the second end of the toggle and a wall of the cavity when the packing clip is engaged with the toggle.

In one or more embodiments of the window opening control device assemblies described herein, the packing clip comprises a foot extending from the baseplate, wherein, when the packing clip is engaged with the toggle, the foot extends into the cavity such that the toggle is located between the clamp and the foot.

In one or more embodiments of the window opening control device assemblies including a packing clip with a foot, when the packing clip is engaged with the toggle, the foot is located in the cavity between a wall of the housing and the first end of the toggle. In one or more embodiments, when the packing clip is engaged with the toggle, the first end of the toggle and the wall of the cavity exert a compressive force on the foot.

In one or more embodiments of the window opening control device assemblies including a packing clip with a foot, the clamp and the foot are configured to exert a compressive force on the toggle along a toggle axis extending through the first end and the second end of the toggle when the packing clip is engaged with the toggle.

In one or more embodiments of the window opening control device assemblies described herein, the pivot axis is located between the clamp and the foot of the packing clip when the packing clip is engaged with the toggle.

In a second aspect, one or more embodiments of a fenestration unit as described herein may include: a fenestration unit frame; a first sash contained within the fenestration unit frame; a second sash contained within the fenestration unit frame; and a window opening control device assembly mounted in a frame member of at least one of the fenestration unit frame and the first sash. In one or more embodiments the window opening control device assembly may include: a housing comprising a cavity and a faceplate attached to the housing, wherein the cavity comprises a cavity opening defined in the faceplate, wherein the housing is located within a void of the frame member, a toggle attached to the housing, the toggle configured to rotate about a pivot axis passing through the cavity, wherein the toggle comprises a first end and a second end, and wherein the toggle is configured to rotate between an extended configuration in which the first end of the toggle protrudes from the cavity opening and the second end of the toggle is located within the cavity and a passing configuration in which the first end of the toggle is located within the cavity and the second end protrudes from the cavity opening, a packing clip engaged with the toggle, the packing clip comprising a baseplate and a clamp extending from the baseplate into the cavity, wherein the clamp of the packing clip is engaged with the second end of the toggle and the baseplate of the packing clip is proximate the faceplate such that the toggle is retained in a neutral configuration between the extended configuration and the passing configuration, wherein the first end and the second end of the toggle are located in the cavity and the baseplate is positioned over the cavity opening when the toggle is in the neutral configuration, and biasing apparatus operably attached to the toggle, the biasing apparatus configured to retain the toggle in the extended configuration when the packing clip is not engaged with the toggle.

In one or more embodiments of the fenestration units including a window opening control device assembly as described herein, the baseplate of the packing clip is seated against the faceplate when the packing clip is engaged with the toggle.

In one or more embodiments of the fenestration units including a window opening control device assembly as described herein, the clamp is configured to exert a compressive force on the toggle when the clamp is engaged with the second end of the toggle.

In one or more embodiments of the fenestration units including a window opening control device assembly as described herein, when the packing clip is engaged with the toggle, the clamp extends into the cavity and towards the first end of the toggle such that the clamp cups the second end of the toggle in the cavity.

In one or more embodiments of the fenestration units including a window opening control device assembly as described herein, the clamp is compressed between the second end of the toggle and a wall of the cavity when the packing clip is engaged with the toggle.

In one or more embodiments of the fenestration units including a window opening control device assembly as described herein, the packing clip comprises a foot extending from the baseplate, wherein, when the packing clip is engaged with the toggle, the foot extends into the cavity such that the toggle is located between the clamp and the foot.

In one or more embodiments of the fenestration units including a window opening control device assembly including a packing clip with a foot as described herein, when the packing clip is engaged with the toggle, the foot is located in the cavity between a wall of the housing and the first end of the toggle. In one or more embodiments, when the packing clip is engaged with the toggle, the first end of the toggle and the wall of the cavity exert a compressive force on the foot.

In one or more embodiments of the fenestration units including a window opening control device assembly including a packing foot with a clip as described herein, the clamp and the foot are configured to exert a compressive force on the toggle along a toggle axis extending through the first end and the second end of the toggle when the packing clip is engaged with the toggle.

In one or more embodiments of the fenestration units including a window opening control device assembly as described herein, the pivot axis is located between the clamp and the foot of the packing clip when the packing clip is engaged with the toggle.

In a third aspect, one or more embodiments of a method of protecting a window opening control device may include: engaging a packing clip with a toggle of a window opening control device, wherein the toggle is attached to a housing comprising a cavity extending away from a faceplate, the toggle being biased to rotate relative to the housing such that a second end of the toggle extends out of the cavity through the faceplate, wherein engaging the packing clip comprises engaging a clamp of the packing clip with a second end of the toggle; and moving the clamp and the second end of the toggle into the cavity of the housing such that a baseplate of the packing clip is positioned proximate the faceplate and the toggle is held in a neutral configuration in which the first end and the second end of the toggle are located in the cavity; wherein the toggle exerts a biasing force on the packing clip that urges the baseplate of the packing clip towards the faceplate.

As used herein and in the appended claims, the singular forms “a,” “an,” and “the” include plural referents unless the context clearly dictates otherwise. Thus, for example, reference to “a” or “the” component may include one or more of the components and equivalents thereof known to those skilled in the art. Further, the term “and/or” means one or all of the listed elements or a combination of any two or more of the listed elements.

It is noted that the term “comprises” and variations thereof do not have a limiting meaning where these terms appear in the accompanying description.

Moreover, “a,” “an,” “the,” “at least one,” and “one or more” are used interchangeably herein.

Where used herein, the terms “top” and “bottom” are used for reference relative to each other when fenestration units are properly installed in a building opening.

Where used herein, the terms “exterior” and “interior” are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the window opening control device assemblies, fenestration units including the window opening control device assemblies, and related methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
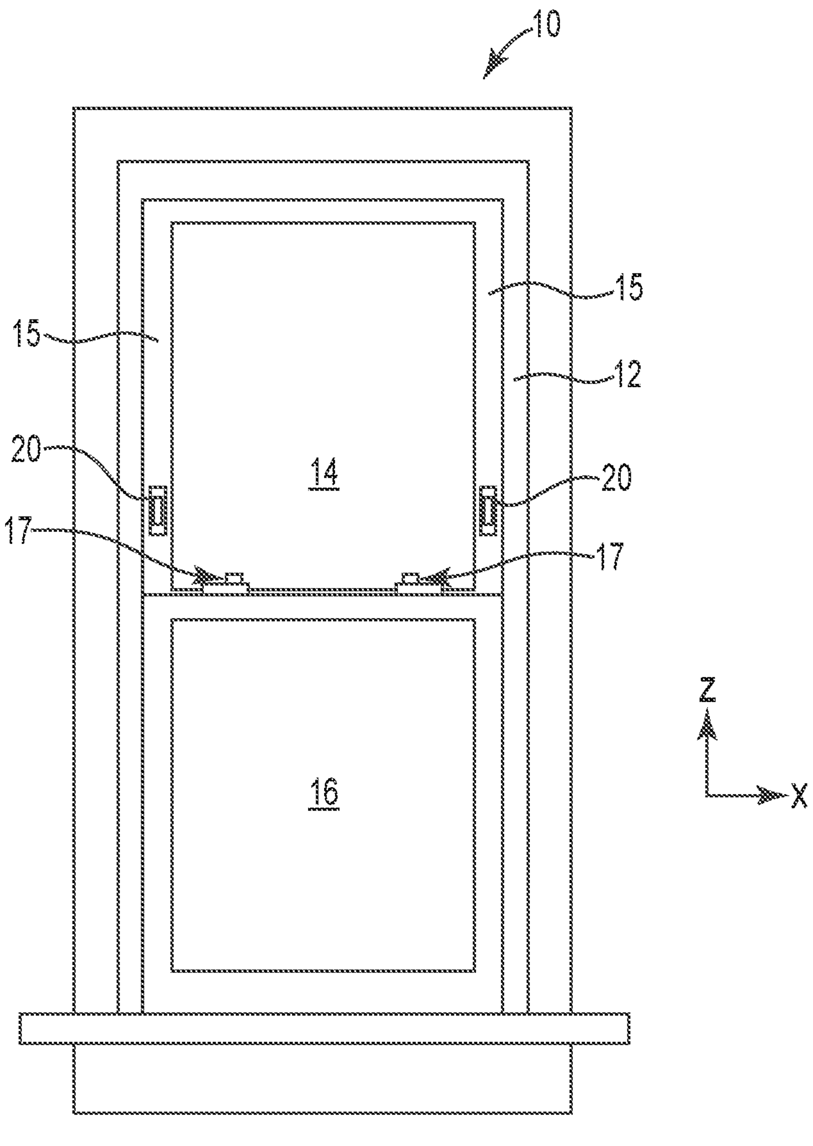
FIG. 1 depicts one illustrative embodiment of a fenestration unit in the form of a single or double hung window including a pair of window opening control devices as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The illustrative embodiment of fenestration unit 10 depicted in FIG. 1 is in the form of a single or double hung window including a fenestration unit frame 12 along with sashes 14 and 16. In the depicted embodiment of fenestration unit 10, the lower sash 16 carries a pair of fenestration lock assemblies 17 on a check rail to lock the sashes 14 and 16 in their closed positions. The upper sash 14 includes a pair of window opening control devices 20 on stiles 15, with the window opening control devices 20 being positioned to restrict movement of the lower sash 16 upwards past the window opening control devices 20.

Although the window opening control devices 20 depicted in connection with fenestration unit 10 are located in the stiles 15 of the upper sash 14, alternative embodiments of fenestration units including window opening control device assemblies as described herein may include only one window opening control device 20. In still other embodiments of fenestration units including a window opening control device assembly as described herein, window opening control device assembly may be positioned in one or more of the frame members of the fenestration unit frame 12 to restrict movement of a movable sash as described herein. Further, although depicted in connection with a double/single hung window, the window opening control device assemblies described herein may also be used in any other type of fenestration unit including a sash or panel that slides or translates in any desired direction to provide an opening in a fenestration unit, e.g., fenestration units commonly referred to as sliders, gliders, etc.

FIG. 1 includes the X and Z axes of a Cartesian coordinate system while the remainder of the figures also include axes corresponding to the same Cartesian coordinate system to assist the reader in understanding the present invention. Unless expressly stated herein, the axes of the Cartesian coordinate system may take any orientation as needed by a user of the apparatus and methods described herein. In other words, the Z axis may not necessarily be oriented vertically with respect to the direction of gravity.

Figure 3:
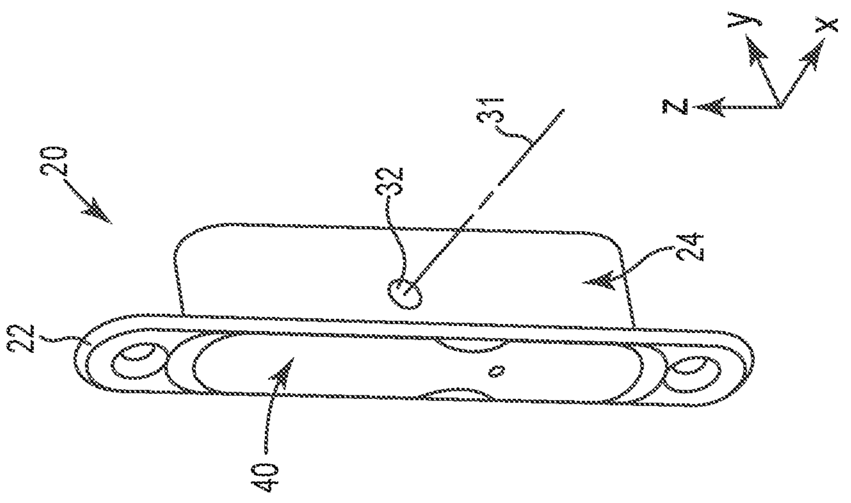
FIG. 3 is a perspective view of the window opening control device assembly of FIG. 2 after the packing clip has been engaged with the window opening control device.
Figure 2:
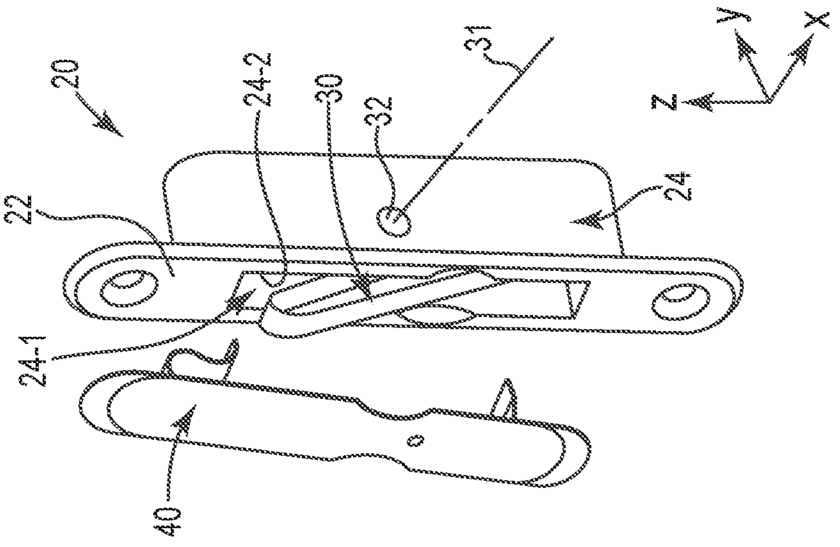
FIG. 2 is an exploded perspective view of one illustrative embodiment of a window opening control device assembly as described herein in which the packing clip is separated from the window opening control device.

FIGS. 2 and 3 are perspective views of one illustrative embodiment of a window opening control device assembly as described herein including a window opening control device 20 and a packing clip 40. In FIG. 2 the packing clip 40 is separated from the window opening control device 20, while in FIG. 3 the packing clip 40 is engaged with the toggle 30 of the window opening control device 20. The window opening control devices that may be used in the window opening control device assemblies including a packing clip as described herein may, in one or more embodiments, be similar to some embodiments of the window opening control devices described in, for example, U.S. Pat. No. 9,816,300 to Derham.

The window opening control device 20 includes a toggle 30 contained in a cavity 24-1 defined within housing 24 with a faceplate 22 attached to the housing 24. The toggle 30 protrudes from a cavity opening 24-2 defined in the faceplate 22. The toggle 30 is mounted for rotation about a pivot member 32 such that the toggle 30 rotates about pivot axis 31.

When engaged with the toggle 30 as depicted in FIG. 3, the depicted illustrative embodiment of packing clip 40 is positioned over the cavity opening 24-2 of the window opening control device 20 with the toggle 30 (although not visible in FIG. 3) being located within the cavity 24-1 in housing 24.

Figure 4:
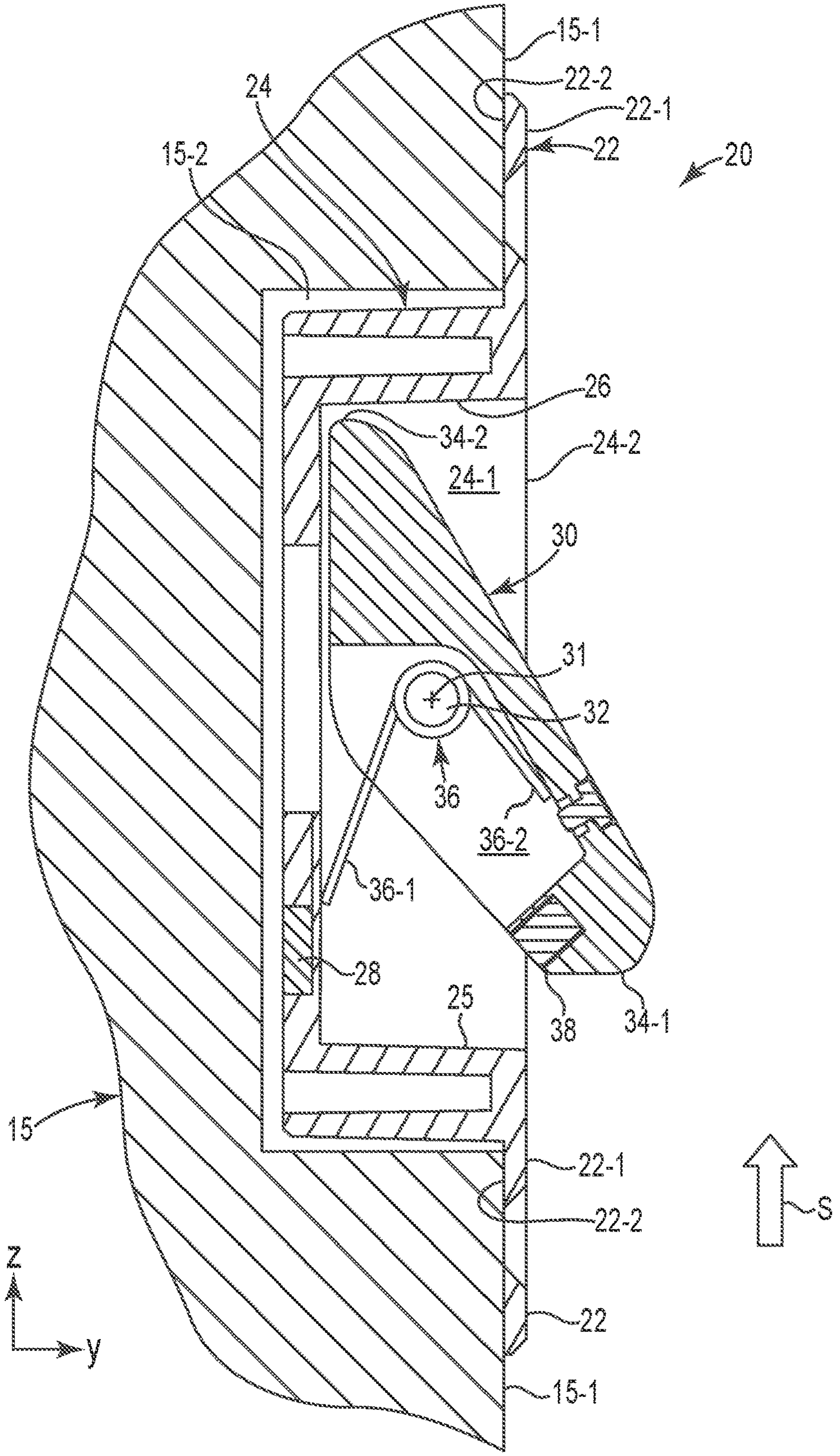
FIG. 4 is an enlarged cross-sectional view of the illustrative embodiment of the window opening control device of FIG. 2 with the toggle in an extended configuration.

FIG. 4 is a cross-sectional view of the window opening control device 20 taken in the Z-Y plane of the Cartesian coordinate system. The window opening control device 20 is also depicted as being located within a frame member of a fenestration unit with the depicted frame member 15 in the form of a stile of upper sash 14 of fenestration unit 10 depicted in FIG. 1. As depicted in FIG. 4, the housing 24 of the window opening control device 20 is positioned in a frame cavity 15-2 while the backside 22-2 of base plate 22 of window opening control device 20 is seated against surface 15-1 of frame member 15. This is, of course, only one example of a window opening control device installed within a frame member of a fenestration unit in many variations may be possible, e.g., installation of the window opening control device 20 in a frame member of a fenestration unit frame, etc.

In the embodiment of window opening control device 20 depicted in FIG. 4, the toggle 30 is typically mounted in housing 24 on pivot member 32 such that toggle 30 rotates about pivot axis 31 passing through the cavity 24-1 in housing 24. The toggle 30 includes a first end 34-1 and a second end 34-2. As seen in FIG. 4, the toggle 30 is in an extended configuration in which the first end 34-1 of the toggle 30 protrudes from the cavity opening 24-2 and the second end 34-2 of toggle 30 is located within the cavity 24-1. With the toggle 30 in the extended configuration of FIG. 4, movement of a sash in the direction of arrow S past the window opening control device 20 is prevented by the toggle 30. With reference to FIG. 1, movement of lower sash 16 past window opening control devices 20 would be prevented by toggles 30 in one or both of the window opening control devices 20.

The depicted illustrative embodiment of window opening control device 20 includes a biasing apparatus 36 operably attached to the toggle 30. The biasing apparatus 36 is configured to force the toggle 30 to the extended configuration in which first end 34-1 of toggle 30 protrudes from the cavity opening 24-2 as depicted in FIG. 4. In the depicted illustrative embodiment, the biasing apparatus 36 is in the form of a torsion spring having arms 36-1 and 36-2 operating on, respectively, the housing 24 and the toggle 30 to force the toggle 30 to the extended configuration. In one or more alternative embodiments, the biasing apparatus can take many different forms such as, but not limited to, elastomeric members, leaf springs, compressible bladders, magnets, etc.

Another feature depicted in connection with the illustrative embodiment of window opening control device 20 are features designed to hold the toggle 30 of the window opening control device in a passing configuration in which the first end 34-1 of the toggle 30 is located within the cavity 24-1 of housing 24 while the second end 34-2 of toggle 30 protrudes from the cavity opening 24-2.

Figure 5:
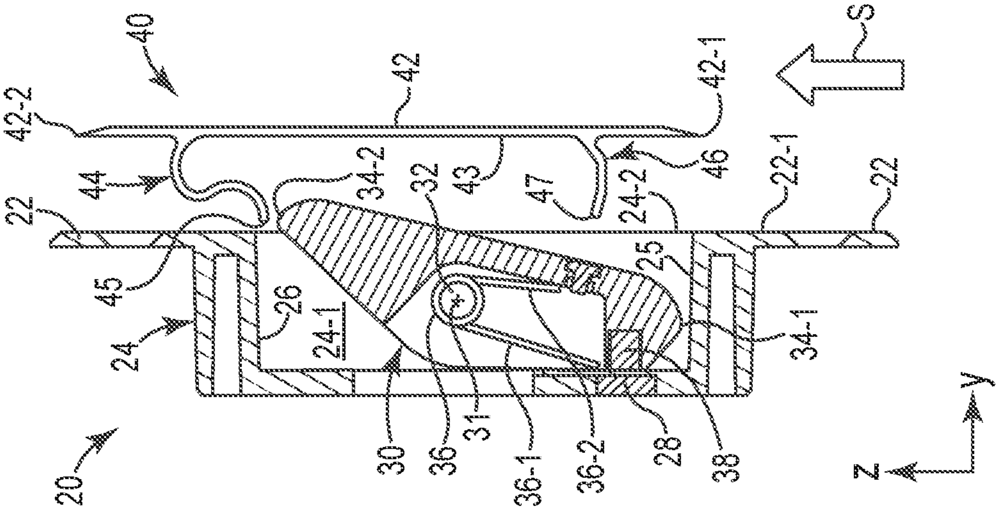
FIG. 5 is a cross-sectional view of the window opening control device of FIGS. 2 and 4 with the toggle restrained in a passing configuration and a side view of one illustrative embodiment of a packing clip before engagement with the toggle of the window opening control device.

With reference to FIG. 5, the toggle 30 of window opening control device 20 is depicted in the passing configuration with the first end 34-1 located in cavity 24-1 and the second end 34-2 protruding from the cavity opening 24-2. The features designed to hold toggle 30 in the passing configuration as seen in FIG. 5 include a pair of magnets with a housing magnet 28 located in housing 24 and a toggle magnet 38 located in toggle 38. When moved to the passing configuration, the magnetic attraction force between magnets 28 and 38 is sufficient to hold the toggle 30 in the passing configuration against the forces provided by biasing apparatus 36 on toggle 30.

In the passing configuration, a sash may be moved past the window opening control device 20 in the direction of arrow S because the first end 34-1 of toggle 34 no longer protrudes from the cavity opening 24-2.

Figure 7:
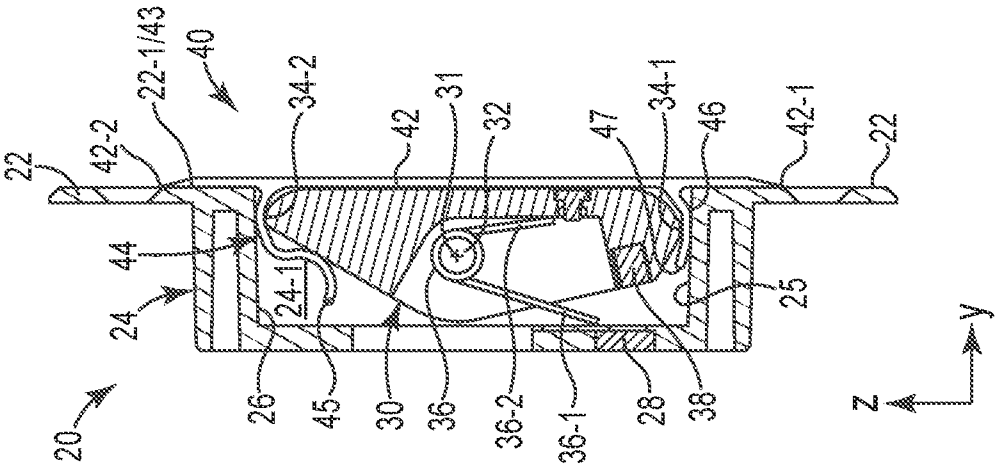
FIG. 7 depicts the window opening control device and packing clip of FIGS. 5 and 6 with the packing clip fully engaged with the toggle of the window opening control device and the toggle in a neutral configuration.
Figure 6:
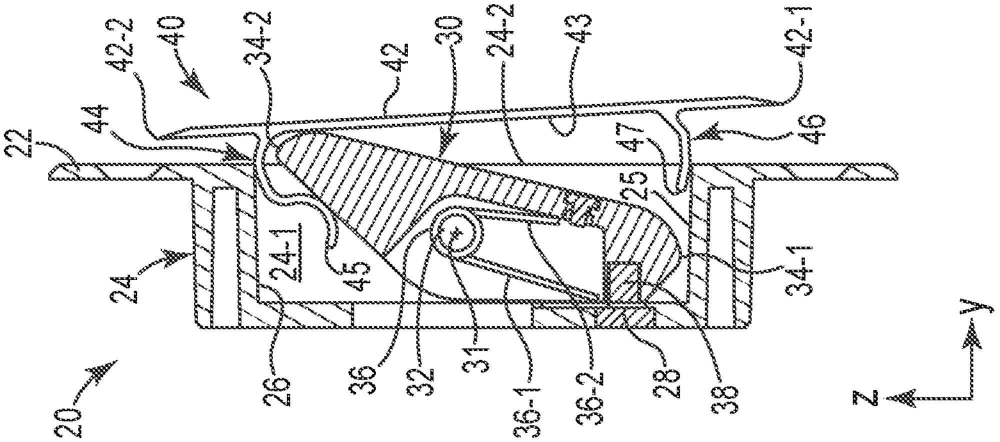
FIG. 6 depicts the window opening control device and packing clip of FIG. 5 after movement of the packing clip into partial engagement with the toggle of the window opening control device.

With reference to FIGS. 5-7, engagement of a packing clip to provide a window opening control device assembly as described herein will be described with reference to the depicted illustrative embodiment of packing clip 40.

Packing clip 40 includes a base plate 42 having a clamp 44 extending from the base plate 42. The depicted illustrative embodiment of packing clip 40 also includes an optional foot 46 extending from the base plate 42. The foot 46 is located closer to a first end 42-1 of the base plate while the clamp 44 is located closer to a second end 42-2 of the base plate 42. The process of engaging the packing clip 40 with the toggle 30 of window opening control device 20 may preferably be performed when the toggle 30 is in the passing configuration in which the second end 34-2 of toggle 30 protrudes from the cavity opening 24-2 as depicted in FIG. 5.

The terminal end 45 of the clamp 44 is advanced into the cavity 24-1 of the housing 24 past the second end 34-2 of toggle 30 while the base plate 42 of packing clip is advanced towards the faceplate 22 of window opening control device 20 as depicted in FIG. 6. Advancement of the base plate 42 of the packing clip 40 towards the faceplate 22 also results in advancement of the terminal end 47 of the foot 46 entering the cavity 24-1 of housing 24 of window opening control device 20.

FIG. 7 depicts the packing clip 40 fully engaged with the toggle 30. When fully engaged with the toggle 30, the clamp 44 of packing clip 40 is engaged with the second end 34-2 of the toggle 30 and the base plate 42 of the packing clip 40 is proximate the faceplate 22 of the window opening control device 20. The optional foot 46 extending from a base plate 42 extends into the cavity 24-1 such that the toggle 30 is located between the clamp 44 and the foot 46 of the packing clip 40 when the packing clip 40 is fully engaged with the toggle 30 as depicted in FIG. 7.

With the magnets 28 and 38 separated such that the toggle 30 is no longer restrained in its passing configuration, the biasing apparatus 36 acts on toggle 30 urging the first end 34-1 of toggle 30 out of the cavity 24-1 and the second end 34-2 of the toggle 30 into the cavity 24-1 to the extended configuration depicted in FIG. 4. Because, however, the packing clip 40 is engaged with the toggle 30, movement of the toggle 30 to the extended configuration is prevented and both the first end 34-1 and second end 34-2 of the toggle 30 are positioned in the cavity 24-1.

The toggle 30 as depicted in FIG. 7 can be described as being in a neutral configuration between the extended configuration of FIG. 4 and the passing configuration of FIG. 5. In the neutral configuration, both the first end 34-1 and the second end 34-2 of the toggle 30 are located in the cavity 24-1 and the baseplate 42 of the packing clip 40 is positioned over the cavity opening 24-2. Further, in the neutral configuration, the rotational forces provided by the biasing apparatus 36 on toggle 30 also urge the base plate 42 of packing clip 40 towards the faceplate 22 of the window opening control device 20.

In one or more embodiments, the base plate 42 of the packing clip 40 may be described as being seated against the faceplate 22 of the window opening control device 20. More particularly, the inner surface 43 of the base plate 42 may be described as being seated against the outer face 22-1 of the faceplate 22 of the window opening control device 20.

In one or more embodiments, the clamp 44 of the packing clip 40 may be described as extending into the cavity 24-1 and towards the first end 34-1 of the toggle such that the clamp 44 cups the second end 34-2 of the toggle 30 in the cavity 24-1.

In one or more embodiments, the clamp 44 may be compressed between the second end 34-2 of the toggle 30 and a wall 26 of the cavity 24-1 when the packing clip is engaged with the toggle 30 as depicted in FIG. 7. In one or more embodiments, the thickness of the clamp 44 may be greater than the gap between the wall 26 of the cavity 24-1 and the second end 34-2 of toggle 30 when the toggle 30 is in the neutral configuration (see, e.g., FIG. 7). In such an arrangement in which the thickness of the clamp 44 is greater than the gap in which the clamp 44 is located, compression of the clamp 44 may assist in retaining packing clip 40 in engagement with the toggle 30.

In one or more embodiments of window opening control device assemblies as described herein in which the packing clip 40 includes a foot 46, the foot 46 may be described as extending into the cavity 24-1 such that the toggle 30 is located between the clamp 44 and the foot 46 as depicted in, e.g., FIG. 7. In particular, the foot 46 of the packing clip 40 may be described as being located in the cavity 24-1 between a wall 25 of the housing 24 and the first end 34-1 of the toggle 30. In one or more embodiments, the thickness of the foot 46 may be greater than the gap between the wall 25 of housing 24 and the first end 34-1 of the toggle 30 when the toggle 30 is in the neutral configuration (see, e.g., FIG. 7). In such an arrangement in which the thickness of the foot 46 is greater than the gap in which the foot 46 is located, compression of the foot 46 may assist in retaining packing clip 40 in engagement with the toggle 30.

In one or more embodiments, the clamp 44 and the foot 46 may be configured to exert a compressive force on the toggle 30 along a toggle axis extending through the first end 34-1 and the second end 34-2 of the toggle 30 when the packing clip 40 is engaged with the toggle 30 as depicted in, e.g., FIG. 7. The toggle axis may be described as being aligned with the Z axis of the depicted Cartesian coordinate system.

In one or more embodiments of the window opening control device assemblies described herein, the pivot axis 31 about which the toggle 30 rotates between its extended configuration and its passing configuration may be described as being located between the clamp 44 and the foot 46 of the packing clip 40 when the packing clip 40 is engaged with the toggle 30 as depicted in, e.g., FIG. 7.

In one or more embodiments of the window opening control device assemblies described herein, the clamp 44 may be described as applying a compressive force on the toggle 30 proximate the second end 34-2 of the toggle 30. With reference to FIGS. 5 and 7, the clamp 44 is deflected from its normal configuration as seen in FIG. 5 when the clamp 44 is engaged with the second end 34-2 of the toggle 30. That deflection can be seen in the increased distance between the terminal end 45 of the clamp 44 and the base plate 42 when engaged with the second end 34-2 of toggle 30 as depicted in FIG. 7 when compared with the un-deflected position of the terminal end 45 of the clamp 44 relative to the base plate 42 as depicted in FIG. 5. The deflection of clamp 44 depicted in FIG. 7 is preferably well within its elastic limits and, as a result, the clamp 44 provides a compressive force on the toggle proximate its second end 34-2.

Figure 10:
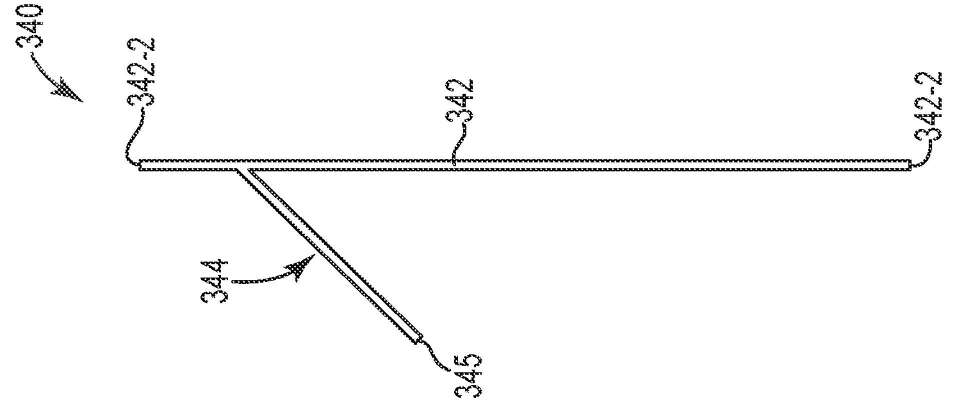
FIGS. 8-10 depict three illustrative alternative embodiments of packing clips that may be used in window opening control device assemblies as described herein.
Figure 9:
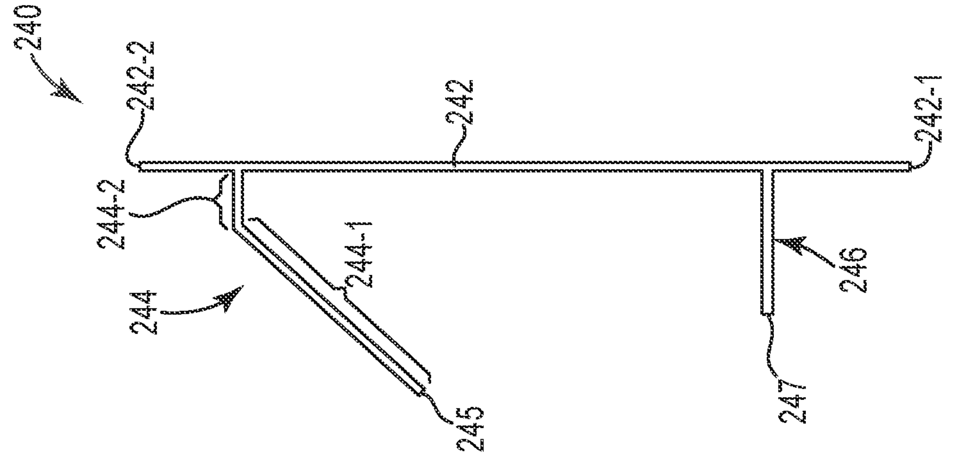
Figure 8:
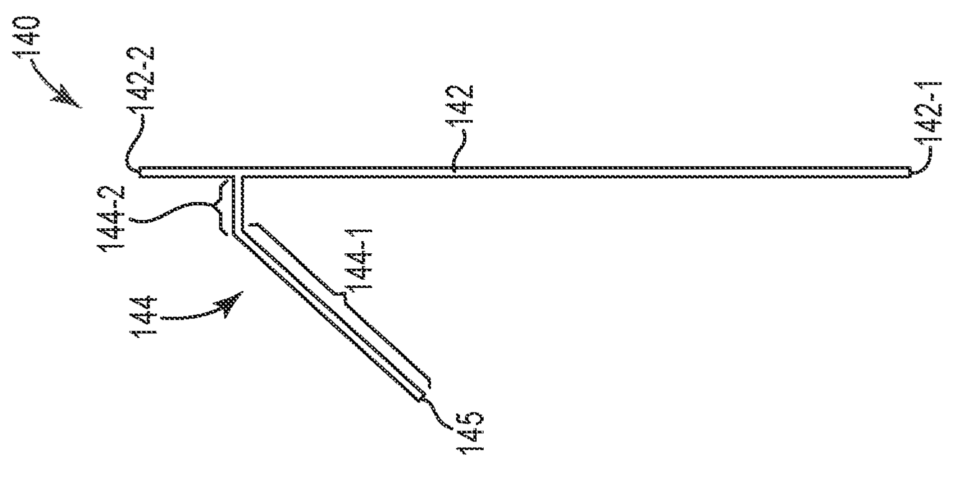

Although one illustrative embodiment of a packing clip that may be used in one or more embodiments of window opening control device assemblies as described herein is depicted in FIGS. 2-7, the packing clips used in such assemblies may take a variety of different forms. FIGS. 8-10 depict only a few illustrative examples of potential alternative packing clips that may be used in the window opening control device assemblies as described herein. In each of the alternative embodiments depicted in FIGS. 8-10, the clamps 144, 244, 344 are configured to engage with the end of a toggle in much the same manner as described above with respect to packing clip 40 and toggle 30.

Packing clip 140 depicted in FIG. 8 includes a base plate 142 and a clamp 144. The base plate 142 extends from a first end 142-1 to a second end 142-2 while the clamp 144 is located closer to the second end 142-2 of base plate 142. The clamp 144 includes an angled portion 144-1 attached to the base plate 142 through an extension 144-2. The angled portion 144-1 extends to a terminal end 145 located closer to the first end 142-1 of the base plate 142 than the clamp extension 144-2 to assist in capturing an end of a toggle using packing clip 140.

Packing clip 240 depicted in FIG. 9 includes a base plate 242 and a clamp 244. The base plate 242 extends from a first end 242-1 to a second end 242-2 while the clamp 244 is located closer to the second end 242-2 of the base plate 242. The clamp 244 includes an angled portion 244-1 attached to the baseplate 242 through and extension 244-2. The angled portion 244-1 extends to a terminal end 245 located closer to the first end 242-1 of the base plate 242 than the clamp extension 244-2 to assist in capturing an end of a toggle using packing clip 240.

Packing clip 240 depicted in FIG. 9 also includes a foot 246 extending from the base plate 242 at a location closer to the first end 242-1 of the base plate to 42. The foot 246 extends to a terminal end 247 distal from the base plate 242. Unlike foot 46 of packing clip 40 which is curved or shaped to cup the first end of a toggle, foot 246 of packing clip 240 is generally straight but may function in much the same manner as the put 46 of packing clip 40.

Packing clip 340 depicted in FIG. 10 includes a base plate 342 and a clamp 344. The base plate 342 extends from a first end 342-1 to a second end 342-2 while the clamp 344 is located closer to the second end 342-2 of the base plate 342. The clamp 344 is angled such that the terminal end 345 of the clamp 344 is located closer to the first end 342-1 of the base plate 342 than the junction between the clamp 344 and the base plate 342.

Illustrative embodiments of the window opening control device assemblies, fenestration units including the window opening control device assemblies, and related methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A window opening control device assembly comprising:

a housing comprising a cavity and a faceplate attached to the housing, wherein the cavity comprises a cavity opening defined in the faceplate;

a toggle attached to the housing, the toggle configured to rotate about a pivot axis passing through the cavity, wherein the toggle comprises a first end and a second end, and wherein the toggle is configured to rotate between an extended configuration in which the first end of the toggle protrudes from the cavity opening and the second end of the toggle is located within the cavity and a passing configuration in which the first end of the toggle is located within the cavity and the second end protrudes from the cavity opening;

a packing clip engaged with the toggle, the packing clip comprising a baseplate and a clamp extending from the baseplate into the cavity, wherein the clamp of the packing clip is engaged with the second end of the toggle and the baseplate of the packing clip is proximate the faceplate such that the toggle is retained in a neutral configuration between the extended configuration and the passing configuration, wherein the first end and the second end of the toggle are located in the cavity and the baseplate is positioned over the cavity opening when the toggle is in the neutral configuration; and a biasing apparatus operably attached to the toggle, wherein the biasing apparatus is configured to force the toggle to the extended configuration when the packing clip is not engaged with the toggle.

2. The window opening control device assembly according to claim 1, wherein the baseplate of the packing clip is seated against the faceplate when the packing clip is engaged with the toggle.

3. The window opening control device assembly according to claim 1, wherein the clamp is configured to exert a compressive force on the toggle when the clamp is engaged with the second end of the toggle.

4. The window opening control device assembly according to claim 1, wherein, when the packing clip is engaged with the toggle, the clamp extends into the cavity and towards the first end of the toggle such that the clamp cups the second end of the toggle in the cavity.

5. The window opening control device assembly according to claim 1, wherein the clamp is compressed between the second end of the toggle and a wall of the cavity when the packing clip is engaged with the toggle.

6. The window opening control device assembly according to claim 1, wherein the packing clip comprises a foot extending from the baseplate, wherein, when the packing clip is engaged with the toggle, the foot extends into the cavity such that the toggle is located between the clamp and the foot.

7. The window opening control device assembly according to claim 6, wherein, when the packing clip is engaged with the toggle, the foot is located in the cavity between a wall of the housing and the first end of the toggle.

8. The window opening control device assembly according to claim 7, wherein, when the packing clip is engaged with the toggle, the first end of the toggle and the wall of the cavity exert a compressive force on the foot.

9. The window opening control device assembly according to claim 6, wherein the clamp and the foot are configured to exert a compressive force on the toggle along a toggle axis extending through the first end and the second end of the toggle when the packing clip is engaged with the toggle.

10. The window opening control device assembly according to claim 6, wherein the pivot axis is located between the clamp and the foot of the packing clip when the packing clip is engaged with the toggle.

11. A fenestration unit comprising:

a fenestration unit frame;

a first sash contained within the fenestration unit frame;

a second sash contained within the fenestration unit frame; and a window opening control device assembly mounted in a frame member of at least one of the fenestration unit frame and the first sash, the window opening control device assembly comprising:

a housing comprising a cavity and a faceplate attached to the housing, wherein the cavity comprises a cavity opening defined in the faceplate, wherein the housing is located within a void of the frame member, a toggle attached to the housing, the toggle configured to rotate about a pivot axis passing through the cavity, wherein the toggle comprises a first end and a second end, and wherein the toggle is configured to rotate between an extended configuration in which the first end of the toggle protrudes from the cavity opening and the second end of the toggle is located within the cavity and a passing configuration in which the first end of the toggle is located within the cavity and the second end protrudes from the cavity opening, a packing clip engaged with the toggle, the packing clip comprising a baseplate and a clamp extending from the baseplate into the cavity, wherein the clamp of the packing clip is engaged with the second end of the toggle and the baseplate of the packing clip is proximate the faceplate such that the toggle is retained in a neutral configuration between the extended configuration and the passing configuration, wherein the first end and the second end of the toggle are located in the cavity and the baseplate is positioned over the cavity opening when the toggle is in the neutral configuration, and a biasing apparatus operably attached to the toggle, the biasing apparatus configured to retain the toggle in the extended configuration when the packing clip is not engaged with the toggle.

12. The fenestration unit according to claim 11, wherein the baseplate of the packing clip is seated against the faceplate when the packing clip is engaged with the toggle.

13. The fenestration unit according to claim 11, wherein the clamp is configured to exert a compressive force on the toggle when the clamp is engaged with the second end of the toggle.

14. The fenestration unit according to claim 11, wherein, when the packing clip is engaged with the toggle, the clamp extends into the cavity and towards the first end of the toggle such that the clamp cups the second end of the toggle in the cavity.

15. The fenestration unit according to claim 11, wherein the clamp is compressed between the second end of the toggle and a wall of the cavity when the packing clip is engaged with the toggle.

16. The fenestration unit according to claim 11, wherein the packing clip comprises a foot extending from the baseplate, wherein, when the packing clip is engaged with the toggle, the foot extends into the cavity such that the toggle is located between the clamp and the foot.

17. The fenestration unit according to claim 16, wherein, when the packing clip is engaged with the toggle, the foot is located in the cavity between a wall of the housing and the first end of the toggle.

18. The fenestration unit according to claim 17, wherein, when the packing clip is engaged with the toggle, the first end of the toggle and the wall of the cavity exert a compressive force on the foot.

19. The fenestration unit according to claim 16, wherein the clamp and the foot are configured to exert a compressive force on the toggle along a toggle axis extending through the first end and the second end of the toggle when the packing clip is engaged with the toggle.

20. The fenestration unit according to claim 16, wherein the pivot axis is located between the clamp and the foot of the packing clip when the packing clip is engaged with the toggle.

* * * * *